(12) United States Patent
van Weenen

(10) Patent No.: US 6,834,459 B2
(45) Date of Patent: Dec. 28, 2004

(54) LINE RECOIL DEVICE

(76) Inventor: Edgar R. van Weenen, 19120 Winslow Terr., Boca Raton, FL (US) 33434

( * ) Notice: Subject to any disclaimer, the term of this patent is extended or adjusted under 35 U.S.C. 154(b) by 0 days.

(21) Appl. No.: 10/394,882

(22) Filed: Mar. 21, 2003

(65) Prior Publication Data

US 2004/0181992 A1 Sep. 23, 2004

(51) Int. Cl.$^7$ ................................................ A01K 91/18
(52) U.S. Cl. ........................................ 43/27.4; 43/43.13
(58) Field of Search ............................ 43/43.12, 43.13, 43/4, 27.4; 114/343, 364

(56) References Cited

U.S. PATENT DOCUMENTS

| | | | |
|---|---|---|---|
| 3,835,571 A | 9/1974 | Berry | |
| 4,334,380 A | * 6/1982 | Daniels | 43/27.4 |
| 4,657,201 A | 4/1987 | Munroe | |
| 4,905,401 A | 3/1990 | Fukumoto | |
| 5,173,067 A | 12/1992 | Biba | |
| 5,177,894 A | 1/1993 | Dunsford | |
| 5,330,122 A | 7/1994 | Wood | |
| 5,725,172 A | 3/1998 | Koehler et al. | |
| 5,867,932 A | 2/1999 | Reiger | |
| 6,036,133 A | * 3/2000 | Milligan | 242/378.4 |
| 6,079,143 A | 6/2000 | Cheatham, Sr. | |
| 6,224,011 B1 | 5/2001 | Gavaza, III | |
| 6,241,063 B1 | 6/2001 | Van Ess et al. | |
| 6,260,785 B1 | 7/2001 | Prais | |
| 6,631,866 B1 | * 10/2003 | Obrink et al. | 242/390.8 |

* cited by examiner

Primary Examiner—Michael J. Carone
Assistant Examiner—Kimberly S. Smith
(74) Attorney, Agent, or Firm—John C. Smith

(57) ABSTRACT

A spring loaded line recoil device which automatically rewinds the line which secures the release clip on a telescoping outrigger when the telescoping outrigger pole is collapsed. Balanced spring assemblies automatically recoil the fishing line on outrigger release clip onto a spool. As one spring assembly increases pressure, the other spring assembly produces pressure to maintain uniform tension on the line holding release clip. The retraction device attaches to the base of an outrigger. When the telescoping outrigger pole is collapsed, the spring assemblies recoil the outrigger line onto a spool. When the telescoping outrigger pole is extended, the position of release clip arm on the outrigger can be moved without changing the overall tension on the line securing the release clip arm due to the counter balanced spring pressure.

10 Claims, 6 Drawing Sheets

LINE RECOIL DEVICE

BACKGROUND OF THE INVENTION

1. Technical Field

The present invention relates to line recoil devices for outriggers and related fishing devices. In particular, it relates to a line recoil device which recoils an outrigger line when an outrigger is collapsed.

2. Background

Fishing is an ancient activity which is pursued for both commercial and recreational reasons. A variety of methods have been developed, such as nets, fishing rods, outriggers, etc., to assist fishermen. Nets are generally used to catch large quantities of fish at the same time, and therefore they are of primary interest to commercial fishermen. In contrast, outriggers and fishing rods are typically used to catch individual fish. As a result, they are more often used by recreational fishermen. Fishing rods allow fishermen to fish from boats, to fish from the shoreline, or even to fish from elevated structures such as bridges. Outriggers are used on boats to extend the placement of a fishing line away from the side of the boat.

Outriggers and fishing rods both control the extension of fishing lines for substantial distances into the water. A problem associated with these types of fishing devices is that they often become entangled. In the case of fishing rods, lines often become entangled during the casting process. This occurs because during the initial is phase of casting, a line is extending at a high-speed. Once the sinker and hook impact the water, the reel continues to spin at a relatively high speed. This may cause the fishing line to create rats nest within the reel. This interrupts the fishing process since the fishermen must stop to disentangle the fishing line before it can be recast.

On the other hand, outriggers experience problems with line entanglement when the outrigger pole is collapsed. The typical outrigger pole is structured as a telescoping device in which multiple segments slidably fit within one another. The tubes may be extended such that the end of the first segment interlocks with the end of the next segment such that the outrigger would have an extended length when the telescoping segments-are extended and a short length when the telescoping segments are collapsed inside one another. A problem that occurs when telescoping outrigger is collapsed is that the line supported by the outrigger does not retract in an orderly manner. During the collapsing process, the fishermen would attempt to collapse the various segments of the telescoping outrigger and simultaneously manipulate the fishing line by hand. Unlike fishing rods, collapsing a telescoping outrigger requires two hands. Due to this, the fishermen collapsing the outrigger is not able to carefully manage the excess fishing line Often this results in the fishing line being ignored while fishermen collapses the outrigger. When this happens, the line falls onto the deck of the boat or becomes entangled in the outrigger. In turn, this can create problems in that the fishermen may have to spend time disentangling the line. In addition, it can also create a safety problem in that the loose fishing line may cause a fishermen to trip while walking down the deck of the boat. It would be desirable to have an automatic method of avoiding entangled fishing lines when the length of outriggers are reduced to improve both the enjoyment, efficiency, and safety of fishing.

While the prior art has provided a variety of outrigger devices, it is failed to provide a convenient method of automatically recoiling the fishing line of an outrigger to reduce line entanglement, and to reduce possible safety hazards.

SUMMARY OF THE INVENTION

The present invention provides a spring loaded device which automatically rewinds an outrigger line when a telescoping outrigger pole is being collapsed. The device uses counter balanced spring assemblies to automatically recoil the fishing line on outrigger onto a spool. As one spring assemblies increases pressure, the other spring assemblies produces tension to keep the line holding the release clip uniformly taught. The retraction device attaches to the base of an outrigger. When the telescoping outrigger pole is collapsed, the spring assemblies recoil the outrigger line onto a spool. The spring loaded recoil device maintains tension on the line when the outrigger is extended, and also allows additional line to be let out to allow the fishermen to move the release clip to a desired position on the outrigger.

DESCRIPTION OF THE PREFERRED EMBODIMENT

Figure 1:
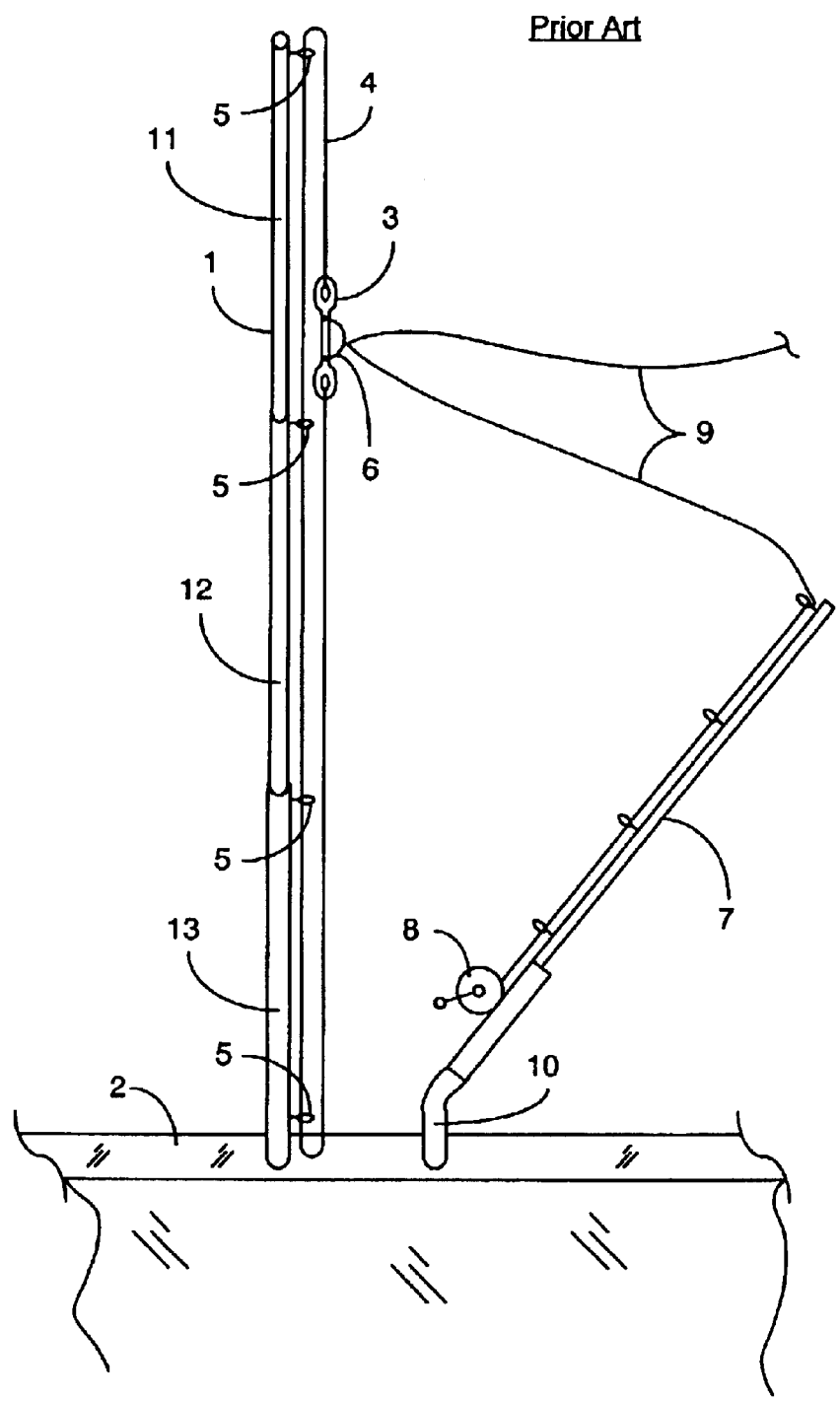
FIG. 1 illustrates a prior art telescoping outrigger attached to the gunnel of a boat. In this figure, the telescoping outrigger is fully extended. A prior art fishing rod is also attached to the boat gunnel and has its fishing line secured by the release clip on the outrigger.

Prior to a detailed discussion of the figures, a general overview of the system will be presented. For ease of discussion, the proximal and of the telescoping outrigger is the end that is secured to the boat gunnel, and the distal and of the telescoping outrigger is the end which extends out from the boat. The invention provides a spring loaded line recoil device that automatically recoils the line which secures the line attached to a release clip on an outrigger. The invention improves both convenience and safety by automatically recoiling the lines used to secure a release clip to an outrigger. In a conventional telescoping outrigger, the outrigger is used in an extended position which requires that the line used to secure and manipulate the release clip on the outrigger have sufficient length to allow the outrigger release clip to be extended to substantially any position along the length of the outrigger. As long as the telescoping outrigger is in the extended position, the outrigger line is taught.

A problem with the outrigger line is what happens when the telescoping outrigger is retracted to a closed position. As the segments of the telescoping outrigger are retracted, the outrigger line is no longer taught and dangles freely on the deck of the boat. Once the outrigger is fully retracted, there can be a substantial amount of line which lays in a random fashion on the boat deck. This loose line can cause a safety hazards are tripping anyone walking past it. This is especially true on a boat which may be subject to substantial motion due to wave action. In addition to the safety issue, there is also a substantial amount of convenience created by loose lines. In particular, when a boat is traveling there is constant motion due to wave action. Quite often a variety of equipment may be on the deck of a boat while it is in motion. It is common on fishing boats to find a variety of deck clutter, including fishing lines, outrigger lines, tackle, etc., move due to the boat's motion, a variety of lines and objects may become entangled. As a result, the fishermen may have to spend considerable amount of time disentangling the lines and other objects.

The invention eliminates one factor related to deck clutter, namely the extended amount of outrigger line which lays loose on the boat deck when a telescoping outrigger is in the retracted position. This is accomplished by a counter balanced spring spool assembly which attaches to the ends of the outrigger lines. The counter balanced spring school assembly contains two spring loaded spools. Each spring loaded spool is attached to an end of an outrigger line. A line storage area is provided on the outer portion of each spool to retain a length of outrigger line. In addition, a spring assembly is also provided on the inner portion of each spool. The spring assemblies connected at one end to a support shaft. The other end of the spring assembly is connected to the line storage area and provides rotational pressure to a such that tension is maintained on the outrigger line.

Each spool can move independently of one another. Also, each spring assembly is oriented such that rotational pressure is provided in the opposite direction of the other spring assembly. When the telescoping outrigger is extended, each line attached to the release clip polls against its perspective spring assembly which provides tension to maintain a taught line. When the telescoping outrigger is retracted, the springs which were compressed during the extension of the telescoping outrigger now apply pressure on the spools which rotate to recoil the excess outrigger line.

As noted above, the springs are oriented such that they apply rotational pressure in opposite directions. When the line recoil device is attached to a telescoping outrigger, the counter balanced springs will apply opposing pressure on an outrigger line. In a preferred embodiment, the lines are sized such that the release clip will have a rest position near the distal end of the telescoping outrigger. When the fishermen wishes to secure a fishing line from a fishing rod to the release clip on the outrigger, the fishermen will pull the line which is not secured by the rings on the outrigger such that the release clip is drawn toward the proximal end of the telescoping outrigger. The fishermen can then conveniently attach the fishing line and then allow the release clip to return to its rest position. Since the springs apply counter balancing tension, the total tension on the outrigger line remains the same. In addition, the only force that the fishermen needs to apply is an incremental pressure to cause the release clip to be drawn toward the proximal end. When the fishermen is putting away the telescoping outrigger, the counter balanced springs each apply tension to their respective ends of the outrigger line such that they are drawn onto their respective spools. As a result, has the fishermen retracts each successive length of extension on the telescoping outrigger, the outrigger line is automatically recoiled. Once recoiled, the problems associated with loose entangled outrigger lines are eliminated. Having discussed the features and advantages of the invention in general, we turn now to a more detailed discussion of the figures.

FIG. 1 illustrates a prior art telescoping outrigger 1 attached to the gunnel 2 of a boat. In this figure, the telescoping outrigger pole 1 is fully extended. For ease of illustration, the telescoping outrigger pole 1 has three segments 11, 12, 13. Those skilled of the art will recognize that while only three segments are shown in this illustration, telescoping outriggers may have any suitable number of extendable segments. The only requirement is that the length of the outrigger, the number of segments, etc., or suitable for the particular size and type of fish being sought.

Also shown in this figure are line rings 5, which are used to secure the outrigger line 4 to the outrigger 1. The ends of the outrigger line 4 are attached to the release clip 3. In normal operation, the release clip 3 is positioned near the distal end of the telescoping outrigger 1. A prior art fishing rod 7 is also attached to the boat gunnel 2 and has its fishing line 9 secured by the release clip arm 6 on the release clip 3. The fishing rod 7 as a conventional fishing line reel 8 and is secured to the boats gunnel 2 by a retention bracket 10. Those skilled in the art will recognize that the size of outriggers 1 and release clips 3 will vary based on the type of boat, the type of fish being sought, etc.

As can be seen from this figure, the length of the outrigger line 4 is sized such that there is no appreciable loose line which might become entangled.

Figure 2:
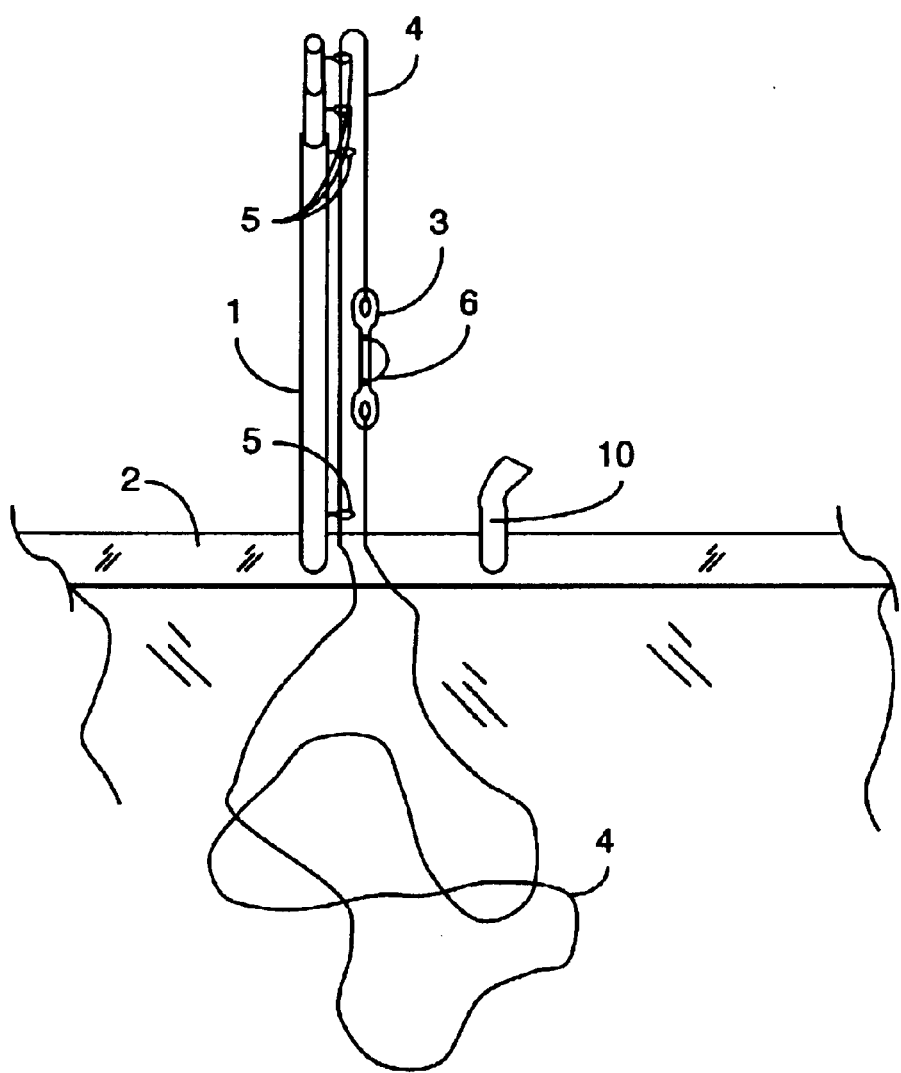
FIG. 2 illustrates a prior art telescoping outrigger attached to a boat gunnel. In this figure, the telescoping outrigger is fully retracted. This figure illustrates the entanglement of the lines which secure the release clip to the outrigger.

FIG. 2 illustrates a prior art telescoping outrigger 1 attached to a boat gunnel 2. In this figure, the telescoping outrigger 1 is fully retracted. This figure illustrates the entanglement of the outrigger lines 4 which secure the release clip 3 to the telescoping outrigger 1. As can be seen, once the outrigger 1 has been retracted, the excess outrigger line 4 rests in an uncontrolled pile on the boat deck. For a typical outrigger 1, the length of outrigger line 4 may be 15 to 25 feet in length. Therefore, when fully retracted, a substantial amount of outrigger line 4 may be resting on the boat deck. If the fishermen is busy with other concerns, and does not have the immediate opportunity to store the excess outrigger line 4, it becomes a hazard which may result in the fishermen tripping and sustaining and injury, or it may become entangled with other fishing equipment or items on the boat deck which will then require additional work by the fishermen in order to disentangle it.

Figure 3:
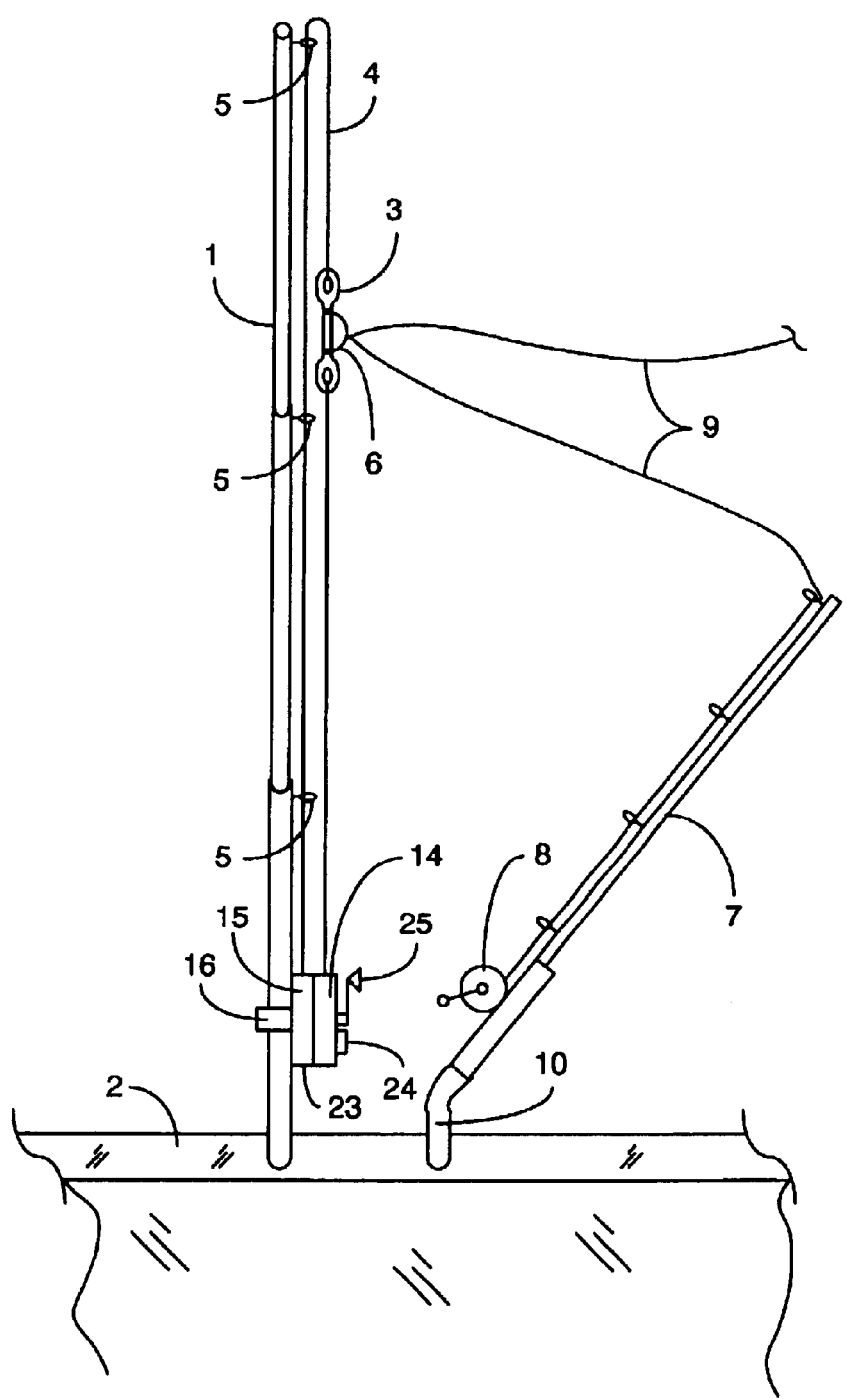
FIG. 3 illustrates a preferred embodiment of the invention in which a line recoil device is attached to a telescoping outrigger. In this figure, the telescoping outrigger is in the fully extended position. Also shown is a prior art fishing rod with its fishing line secured by the release clip on the telescoping outrigger.

In FIG. 3, a preferred embodiment of the invention is illustrated in which a line recoil device 23 is attached to a telescoping outrigger 1. The line recoil device 23 includes clamp 16, first spring assembly 14, and second spring assembly 15. In this figure, the telescoping outrigger 1 is shown in the fully extended position. In the fully extended position, the outrigger line 4 is secured to release clip 3 and is secured under tension from first spring assembly 14 and second spring assembly 15. The first and second spring assemblies 14, 15 provide sufficient tension to keep outrigger line 4 taught. Also shown is a prior art fishing rod 7 with its fishing line 9 secured by the release clip 3 on the telescoping outrigger 1.

In this position, the release clip 3 is in a rest position. In the rest position, which is preferably near the proximal end of the telescoping outrigger 1, the first and second spring assemblies 14, 15 apply sufficiently equal tension to the outrigger line 4 such that the outrigger line 4 is at rest and does not move. The reason for having a rest position near the proximal end of the telescoping outrigger 1 is that, most of the time, the outrigger 1 will the stored in the retracted position. Therefore, by having the rest position located near the proximal end of the outrigger 1, it allows the outrigger 1 to be stored with the minimal amount of tension on the outrigger lines 4. In the event that the fishermen wishes to attach the new fishing line 9 to the release clip 3, the fishermen need only to pull the outrigger line 4 such that its slides toward the proximal end of the telescoping outrigger 1. Only enough pressure is required to overcome the difference between the tensions applied by the first and second spring assemblies 14, 15. Once the fishermen is finished with release clip 3, the fishermen then releases the outrigger line 4 and the first and second spring assemblies 14, 15 return the release clip 3 to its rest position. While the simplest design allows the fishermen to manually pull the outrigger line 4 to move the release clip 3, those skilled in the art will recognize that the addition of an optional crank handle 25, such as that used on a typical fishing reel, will provide the fishermen with more convenience and allow the release clip 3 to be more easily moved back and forth along the length of the outrigger 1.

While the first and second spring assemblies 14, 15 and outrigger line 4 can be initially adjusted such that the rest position is near the distal end of the telescoping outrigger 1, those skilled of the art will recognize that the addition of an optional lock 24 on the first and second spring assemblies 14, 15 will allow the fishermen to precisely set the position of the release clip 3. Locking mechanisms are well-known in the art and need not be discussed in further detail herein.

Figure 4:
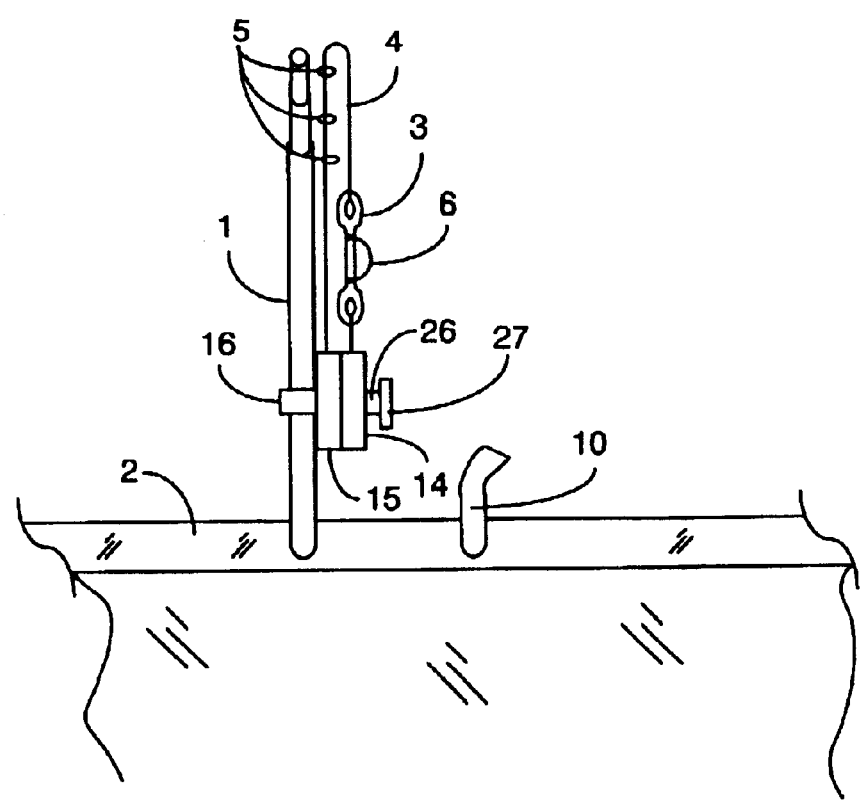
FIG. 4 illustrates a preferred embodiment of the invention in which a line recoil device is attached to the telescoping outrigger. In this figure, the telescoping outrigger is in the fully retracted position.

FIG. 4 illustrates a preferred embodiment of the invention in which a line recoil device 23 is attached to the telescoping outrigger 1. In this figure, the telescoping outrigger 1 is in the fully retracted position. This figure illustrates a principal advantage of the invention in that as the segments 11, 12, 13 of the telescoping outrigger 1 are moved to the retracted position, tension from the first and second spring assemblies 14, 15 on the ends of the outrigger line 4 causes them to be recoiled around their respective spools in first and second spring assemblies 14, 15. As a result, the problems associated with loose outrigger lines 4 are eliminated.

Also shown in this figure is an optional gear assembly 26 which can allow the first and second spring assemblies 14, 15 to be placed outside of the spool. In addition, an optional power drive 27 (i.e., a vacuum pump or battery-powered motor), can be used in place of the first and second spring assemblies 14, 15 to power the recoiling of the outrigger line 4.

Figure 5:
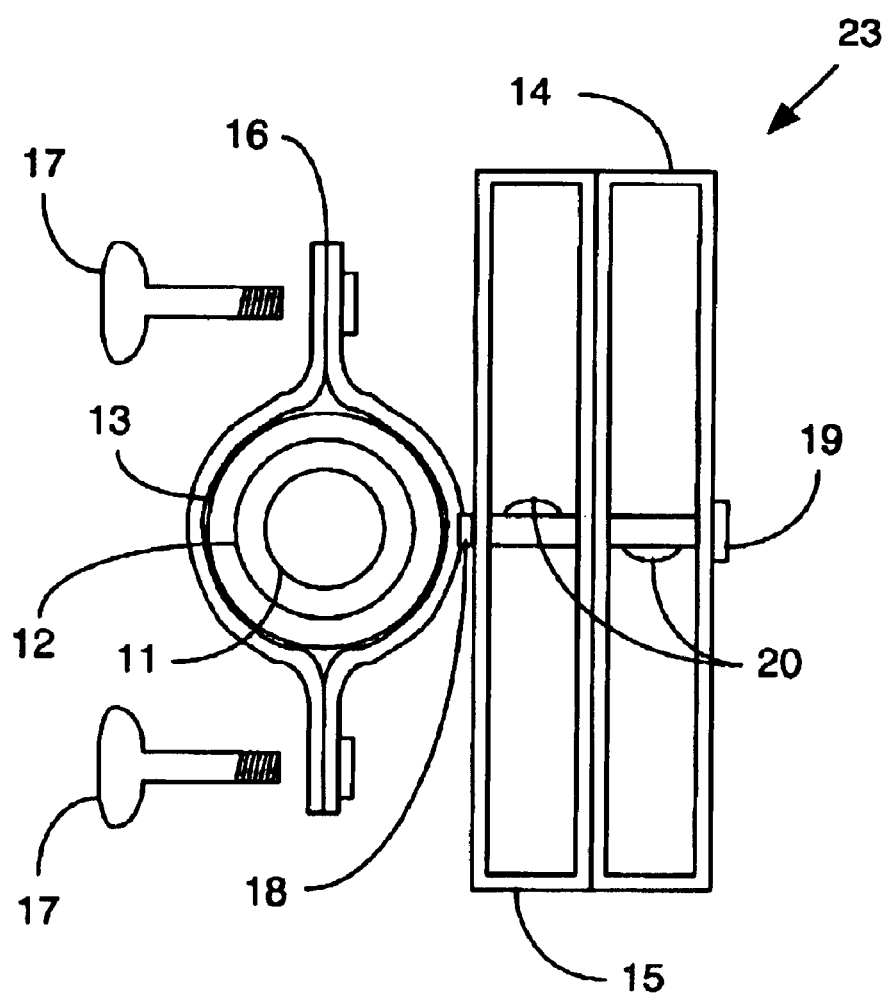
FIG. 5 illustrates a cutaway end view of a preferred embodiment of the invention. This view illustrates a line recoil device secured to a telescoping outrigger.

FIG. 5 is a cutaway end view of a preferred embodiment of the invention. In this view, a line recoil device 23 secured to a prior art telescoping outrigger 1. The individual segments 11, 12, 13 of the telescoping outrigger 1 are shown in relationship to one another as they would be if the telescoping outrigger 1 was in the retracted position. Clamp 16 is secured to the telescoping outrigger 1 by bolts 17. In turn, clamp 16 has a shaft 18 which extends through the first and second spring assemblies 14, 15, thereby securing them to the telescoping outrigger 1 with retaining nut 19. For ease of illustration, the spool portions of the first and second spring assemblies 14, 15 have been omitted to show the spring retainers 20.

In a preferred embodiment, the first and second spring assemblies 14, 15 are approximately six to seven inches in diameter with a width of approximately 1 half inch. Those skilled in the art will recognize that the exact dimensions of the first and second spring assemblies 14, 15 are not critical and may vary so long as the first and second spring assemblies 14, 15 are able to provide sufficient tension for outrigger line 4.

Figure 6:
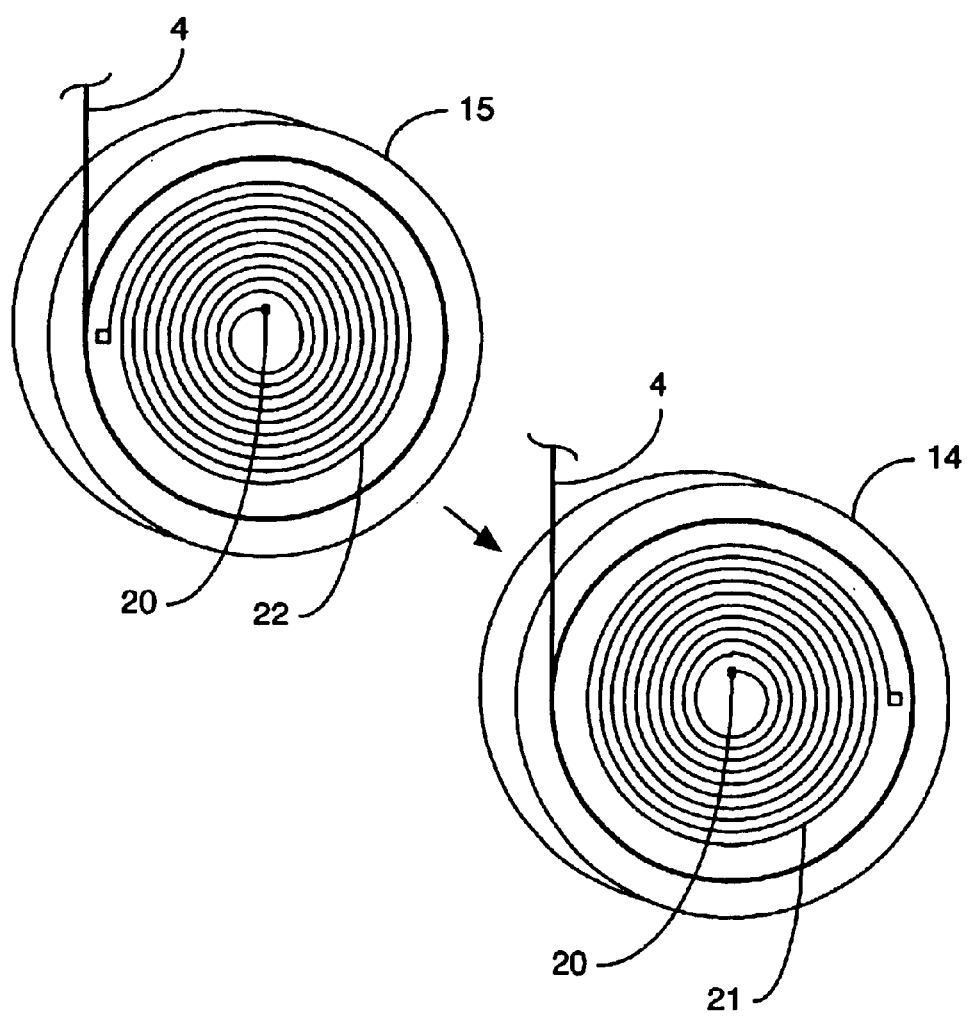
FIG. 6 illustrates an exploded perspective view of a preferred embodiment of the invention. This view illustrates the spring assemblies of the line recoil device arranged in opposing pressure orientations.

FIG. 6 illustrates an exploded perspective view of a preferred embodiment of the invention. This view illustrates the first and second spring assemblies 14, 15 of the line recoil device 23 arranged in opposing pressure orientations. This figure is illustrated with simple coil springs 21, 22. However those skilled in the art will recognize that any type of spring mechanism can be used to supply the tension for outrigger line 4. For example, instead of the direct drive provided by coil springs 21, 22, the springs can be attached via optional gear assemblies 26. Of course, the type of spring drive used will affect the size and weight of the line recoil device 23.

In this figure, coil springs 21, 22 are attached to spring retainers 20, but are wrapped around the shaft 18 (not shown in this figure) in different directions. As a result, when the outrigger 1 is extended, outrigger lines 4 to rotate the spring assemblies 14, 15 causing one spring to increase spring tension and the other to reduce the spring tension. As a result, the total amount tension on outrigger line 4 remains the same. It is intended that when the telescoping outrigger 1 is fully retracted, there will still be a sufficient amount of tension to coil the outrigger lines 4 around their respective spring clip assemblies 14, 15. As the telescoping outrigger 1 is extended, the total tension is increased.

The foregoing embodiments disclosed the invention using a spring mechanism to provide tension. However, those skilled in the art will realize that anything capable of generating tension (e.g., vacuum pressure, etc.) to outrigger lines 4 can be used in place of first and second springs 14, 15. Springs are merely preferred because they are the simplest at least expensive tensioning devices.

Those skilled in the art will realize that the line recoil device 23 can be fabricated from any suitable material. The only limitations on the material selected is their ability to withstand the environmental forces which they will be exposed to in a marine environment. Not only will components be subjected to saltwater, but they will also subjected to frequent and substantial amounts of ultraviolet radiation, humidity, heat, etc. As a result, the materials used to fabricate the line recoil device 23 must be selected with environmental factors in mind.

While the invention has been described with respect to a preferred embodiment thereof, it will be understood by those skilled in the art that various changes in detail may be made therein without departing from the spirit, scope, and teaching of the invention. For example, the material used to fabricate line recoil device may be anything suitable for its purpose, the size and shape of the line recoil device can vary. The type of springs and their method of attachment can vary, etc. Accordingly, the invention herein disclosed is to be limited only as specified in the following claims.

I claim:

1. An outrigger line recoiler for an outrigger using a release clip and an outrigger line, further comprising:

a first tension source for providing tension to a first end of an outrigger line;

a second tension source for providing tension to a second end of the outrigger line;

the first and second tension sources providing sufficient tension to maintain taughtness of the outrigger line;

first spool means attached to the first tension source, and providing storage space for spooling the portion of the release of line attached to the first tension source;

second spool means attached to the second tension source, and providing storage space for spooling the portion of the release of line attached to the second tension source; and attachment means to attach the outrigger line recoiler to an outrigger;

whereby the outrigger line recoiler keeps the outrigger line under tension.

2. An outrigger line recoiler, as in claim 1, wherein:

the first tension source is a spring; and the second tension sources is a spring.

3. An outrigger line recoiler, as in claim 2, wherein:

the first tension source and the second tension source apply opposing tension to the outrigger line such that, when the opposing tensions are equal, the outrigger line will remain in a stationary rest position.

4. An outrigger line recoiler, as in claim 3, further comprising:

a lock attached to the line recoiler having an unlocked position wherein the first and second tension sources will balance one another at a rest position, and further having a lock position wherein the first and second tension sources are prevented from moving the outrigger line.

5. An outrigger line recoiler, as in claim 3, further comprising:

a crank assembly attached to the outrigger line recoiler such that, when cranked, a release clip attached to the outlet line is moved;

whereby the outrigger line can be moved under control of the crank.

6. An outrigger line recoiler, as in claim 2, wherein:

first and second tension sources are counter balanced such that when attached to an outrigger line, they provide tension in opposing directions.

7. An outrigger line recoiler, as in claim 6, wherein:

the first tension source and the second tension source apply opposing tension to the outrigger line such that, when the opposing tensions are equal, the outrigger line will remain in a stationary rest position.

8. An outrigger line recoiler, as in claim 1, further comprising:

a gear assembly attached to the first and second tension sources; and the gear assembly further attached to the first and second spool means such that tension is applied from first and second tension sources to the spool means by the gear assembly.

9. An outrigger line recoiler, as in claim 1, further comprising:

a vacuum power source, the vacuum power source generating tension for the first and second tension sources.

10. An outrigger line recoiler, as in claim 1, further comprising:

the first and second tension sources generate tension via an electric motor.

* * * * *